(12) United States Patent
Hughes et al.

(10) Patent No.: US 6,617,792 B2
(45) Date of Patent: Sep. 9, 2003

(54) PIXEL MIRROR BASED STAGE LIGHTING SYSTEM

(75) Inventors: Michael Hughes, Wolverhampton (GB); William Hewlett, Birmingham (GB); Ian Clarke, Walsall (GB)

(73) Assignee: Light and Sound Design Ltd., Birmingham (GB)

( * ) Notice: Subject to any disclaimer, the term of this patent is extended or adjusted under 35 U.S.C. 154(b) by 0 days.

(21) Appl. No.: 10/038,182

(22) Filed: Oct. 24, 2001

(65) Prior Publication Data

US 2002/0101199 A1 Aug. 1, 2002

Related U.S. Application Data

(62) Division of application No. 09/756,037, filed on Jan. 5, 2001, now Pat. No. 6,515,435, which is a division of application No. 09/145,313, filed on Aug. 31, 1998, now Pat. No. 6,208,087.

(51) Int. Cl.[7] .................................................. H01K 7/00
(52) U.S. Cl. .......................................... 315/32; 315/46
(58) Field of Search .......................... 315/94, 106, 107, 315/104, 32, 46

(56) References Cited

U.S. PATENT DOCUMENTS

| | | | | |
|---|---|---|---|---|
| 4,588,927 A | * | 5/1986 | Kanno et al. | 315/307 |
| 5,486,698 A | * | 1/1996 | Hanson et al. | 250/332 |
| 5,868,666 A | * | 2/1999 | Okada et al. | 600/118 |

* cited by examiner

Primary Examiner—David Vu
(74) Attorney, Agent, or Firm—Fish & Richardson P.C.

(57) ABSTRACT

A lighting system with a digital micromirror device which forms a digital gobo system that is controllable on a pixel level. The device includes a number of sensitive electronic elements. The device is controlled by two different controllers: a digital signal processor which is effectively the number crunching portion, and a controller, which controls the functions of the light. The controller also logs errors into a registry, such as a non-volatile memory. A field programmable gate array is used for a number of purposes, including to form the ports. One of those ports is used to detect status of the light such as faults.

36 Claims, 6 Drawing Sheets

PIXEL MIRROR BASED STAGE LIGHTING SYSTEM

CROSS-REFERENCE TO RELATED APPLICATIONS

This application is a divisional of and claims priority to U.S. application Ser. no. 09/756,037, filed Jan. 5, 2001, now U.S. Pat. No. 6,515,435, which is a divisional of U.S. application Ser. No. 09/145,313, filed Aug. 31, 1998, now U.S. Pat. No. 6,208,087.

The present invention describes improvements in a digital mirror stage lighting system. More specifically, the present invention describes techniques which are used to improved operation in the special environment produced by the digital mirror stage lighting system.

BACKGROUND OF THE INVENTION

Stage lighting systems have increased in complexity in recent years. It is desirable to be able to change literally any aspect of the beam projected by a stage light from a remote location. Light & Sound Design, the assignee of the present application, have suggested in other patents and applications that many of these issues couple be improved by a stage lighting system that uses an active, x, y addressable element with a digital micromirror device ("DMD") available from Texas Instruments. These devices use an array of controllable mirrors to selectively reflect light in pixel units. These devices have also been called digital mirror, digital light processor (DLP), and other names. Light can be selectively reflected in units of picture elements or pixels. This allows total control of light shape and certain other characteristics. Other devices which are controllable to selectively change characteristics of pixels of light, such as a grating light valve (GLV), can also be used for this purpose.

These concepts are disclosed in several pending patent applications of Light & Sound Design, including Ser. No. 08/854,353, the disclosures of which are herewith incorporated by reference to the extent necessary for proper understanding.

The pixel based light processors, however, themselves produces certain issues, including control issues and cooling issues. The present disclosure describes these and other issues which were found to exist, and describes certain solutions found by the inventors to combat these issues.

SUMMARY OF THE INVENTION

A number of aspects are described according to the present invention, and the following summary explains at least some of these aspects.

A first aspect includes control of the digital mirror device (DMD) and other associated operations. The control is typically completely digital, and many of the operations are carried out entirely mathematically. Therefore, a distributed control with a first control element that carries out mathematical calculations and a second control element which is optimized for control is desirable.

According to an aspect of the embodiment, the second control element is affected out entirely by a programmable gate array, such as a field programmable gate array or similar configurable device. A particularly preferred embodiment reconfigures the device after bulb startup, to avoid noise danger during the bulb startup.

Another aspect is that the digital mirror has loses a certain amount of light. This has required brighter, and hence more power intensive, bulbs. One aspect of this invention is relates to how the operation occurs to keep the heat of the bulb and ignition of the bulb from affecting the other subsystems.

The great amount of heat has produced the need for advanced cooling techniques. However, the digital mirror has specialized temperature requirements. According to this aspect, a pulse-driven thermoelectric cooler is used and the pulse width to the cooler is changed to change the amount of cooling.

Other aspects of this invention describe the way in which the control element carries out the operation.

BRIEF DESCRIPTION OF THE DRAWINGS

These and other aspects of the invention will now be described in detail with respect to the accompanying drawings, in which.

DESCRIPTION OF THE PREFERRED EMBODIMENTS

Figure 1:
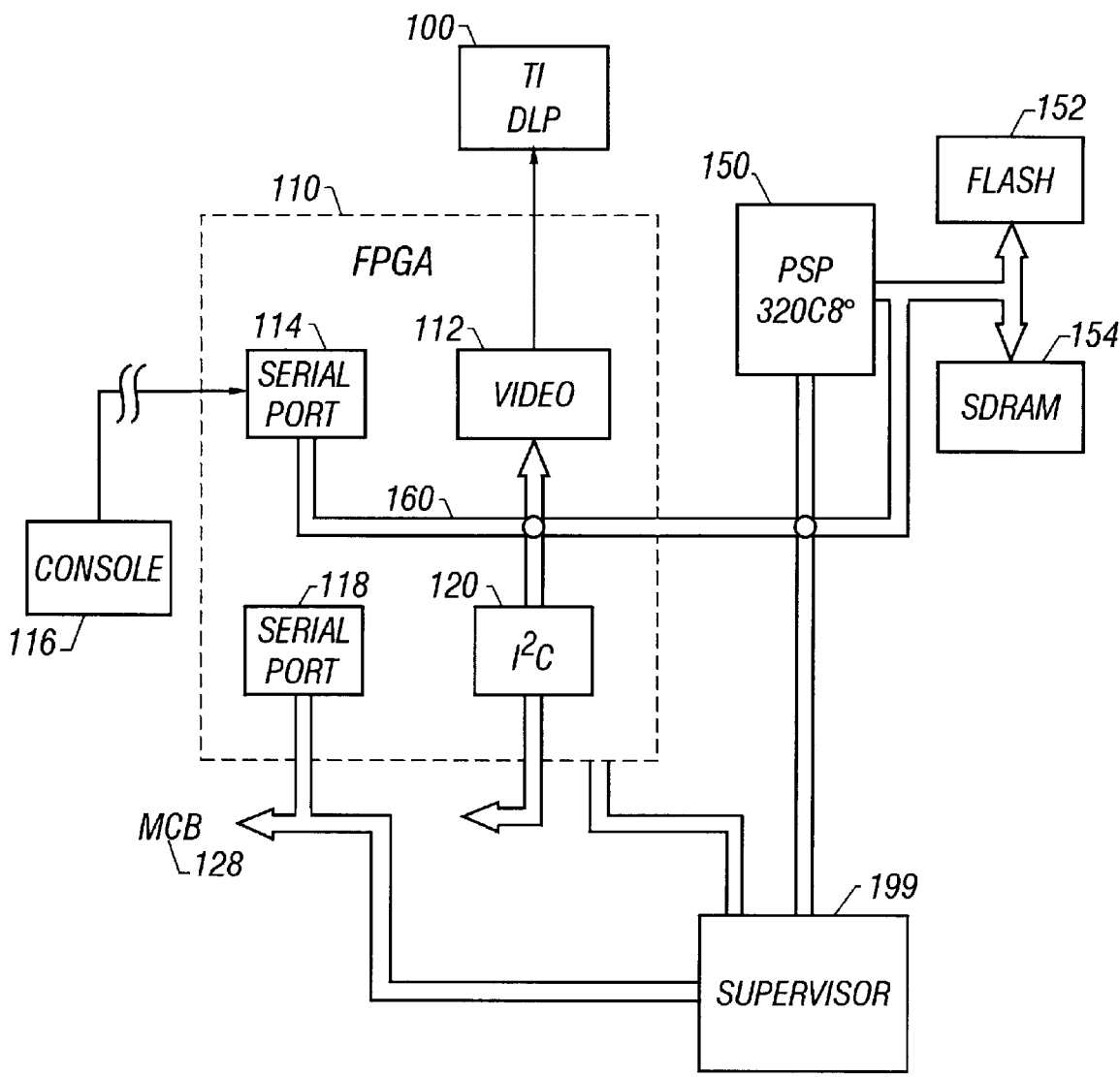
FIG. 1 shows a block diagram of the electronics of the system.

FIG. 1 shows a block diagram of the electronic control system of the preferred embodiment. The TI DLP board 100 is an off the shelf board from Texas Instruments which carries out control of the digital mirror and other pre-defined functions. Associated functions for control of this system are carried out in a field programmable gate array 110 which is preferably of the electronically reconfigurable type. This device is reconfigured into certain logical devices.

The video is controlled by a digital signal processor 150, in this case, a 320C80. The digital signal processor ("DSP") 150 carries out certain operations under control of the user. DSP 150 also includes two different kinds of slave memory, a flash memory 152 which includes the main program for the DSP 150 and which also includes certain shapes for various controlled lights. Certain information is also stored in synchronous DRAM 154. On start up, the initial program is transferred from flash memory 152 into the sync DRAM 154 and used to control the digital signal processor 150 and certain other aspects of the electronics. The video device produces an output in the form used by the DLP board 114.

Serial port 114 is connected to receive data from the controlled console 116. This data can be sent in any desired serial format and the information is placed on the main data bus 160. Another serial port 118 is an RS-485 bus driver to form the motor control bus which is described further herein. An IIC port 120 is also formed for other communication operation.

Serial data from the console 116 received via a serial port 114 is input directly to the master digital signal processor ("DSP") 150, which is preferably a Texas Instruments multimedia video processor ("MVP") model number TMS320C80. DSP 150 uses the information to provide a serial port output which is converted to RS-485 protocol by bus driver serial port driver 118. The motor control bus is preferably an RS485 bus which controls and communicates with each of the motor subsystems as described in our copending applications.

Each of the motor control subsystems is a separated unit including all of the hardware necessary to control its associated motor and other hardware according to applied commands. The motor control subsystem includes a dedicated control structure. For example, a pan/tilt motor subsystem includes all controlling structure for the motor, and the motor itself. This combination allows a modular operation, precise matching between components, and more accurate calibration.

Master DSP 150 has primary responsibility for controlling operations of the lamp including control of the DMD. This latter operation requires computation of complex operations to provide control information for the DMD. At times, these calculations leave little time for the master DSP 150 to do much else.

A separate supervisor system 199 has primary responsibility for monitoring status of the lamp and making decisions based on that status. Supervisor 199 is also connected to the motor control bus. Supervisor 199 is preferably a microcontroller as describer herein. The microcontroller monitors status of the subsystems including the master. The microcontroller can also control the motor control bus when the determined status makes that appear desirable or necessary.

Unlike digital signal processor 150, however, the microcontroller is a very technically simple device, adapted for watching the bus and other devices, and monitoring for errors. The microcontroller carries out minimal number crunching; its primary function is to protect and diagnose faults. The supervisor also controls various other functions in the system.

The supervisor 199 monitors the output of temperature sensors to monitor and control various temperatures within the system. Supervisor 199 is also connected to the ballast of the lamp to monitor the condition and operation of the ballast. Finally, supervisor 199 receives possible program parameters from flash memory unit 152.

The operation of the DMD 100 is controlled by master DSP 156 to form any light shape which can be described as a plurality of pixels. A library of possible shapes is stored in image SDRAM 154.

The serial communications device 114 can also be a dual port RAM with a mailbox. In this case, the information is set into the RAM, and is flagged. The DSP 150 monitors for new data by investigating the flag to determine whether the flag is set. Whenever the flag is set, DSP 150 retrieves the new information from the RAM and appropriately processes it.

As described above, many of the control device structures can be effected using a field programmable gate array 110. More specifically, any communications port or communications driver, and/or any and all output buffers are preferably formed by reconfiguration of the FPGA. The structures can be described using hardware definition language "HDL" or each of the electronic structures can be configured. Many various canned configurations for FPGAs are well known.

Figure 2:
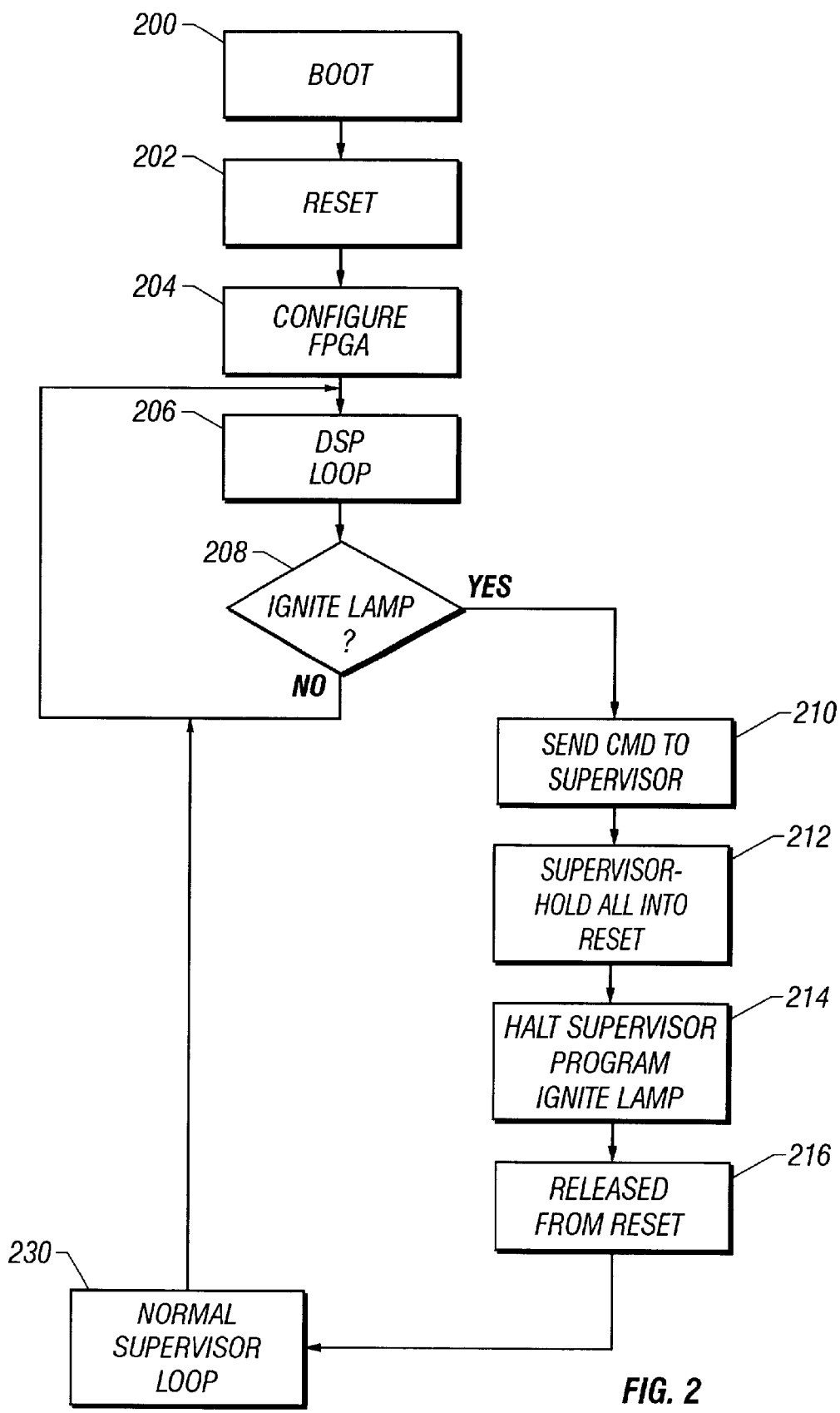
FIG. 2 shows a flowchart of operation of the system of the supervisor.

The operation of the system is controlled according to the flowchart of FIG. 2. The system initially boots at step 200, which requires transferring the system program from protected flash memory 152 to SDRAM 154, and beginning operation. At step 202 a global reset is generated. This global reset includes at least the DSP reset vector, and may also force a mechanical reset of all motors.

After the reset at step 202, the DSP main loop is running. The DSP main loop then sends a command to configure the FPGA 110 at step 204. The command to configure the FPGA 110 causes the FPGA to form the different logical blocks shown in FIG. 1. After this, the DSP loop continues shown generically as step 206. This includes receiving commands from the console, and other housekeeping functions. The normal loop continues until an ignite lamp command is received at step 208. The lamp is a very high powered lamp, and requires an inductive ballast for operation. The transients produced by the lamp ignition can cause noise transients in the rest of the system.

When the ignite lamp command is received at step 208, a corresponding command is sent to the supervisor subsystem indicating same at step 210. The supervisor is a low level system, as described above, which is optimized for control of faults. The supervisor has overall control of many of the reset functions, and at step 212, initiates a responsive reset. This includes including a break on the motor control bus, holding all the serial com ports in reset, and commanding all boards attached to the supervisor into a hard reset state. The operations in step 212 are done to prepare the system for the inevitable electromagnetic pulse that will be produced by the striking of the bulb. Once all of the above is completed, at step 214, the supervisor program is halted, and the lamp is ignited. This ignition uses a special subprogram during which no other operations are carried out.

FIG. 2 shows this as halting the supervisor program. After the lamp is ignited at step 214, the supervisor and all subsystems are released from reset at step 216. Operation then returns to the normal supervisor loop and the normal DSP loop shown as 230.

Figure 3:
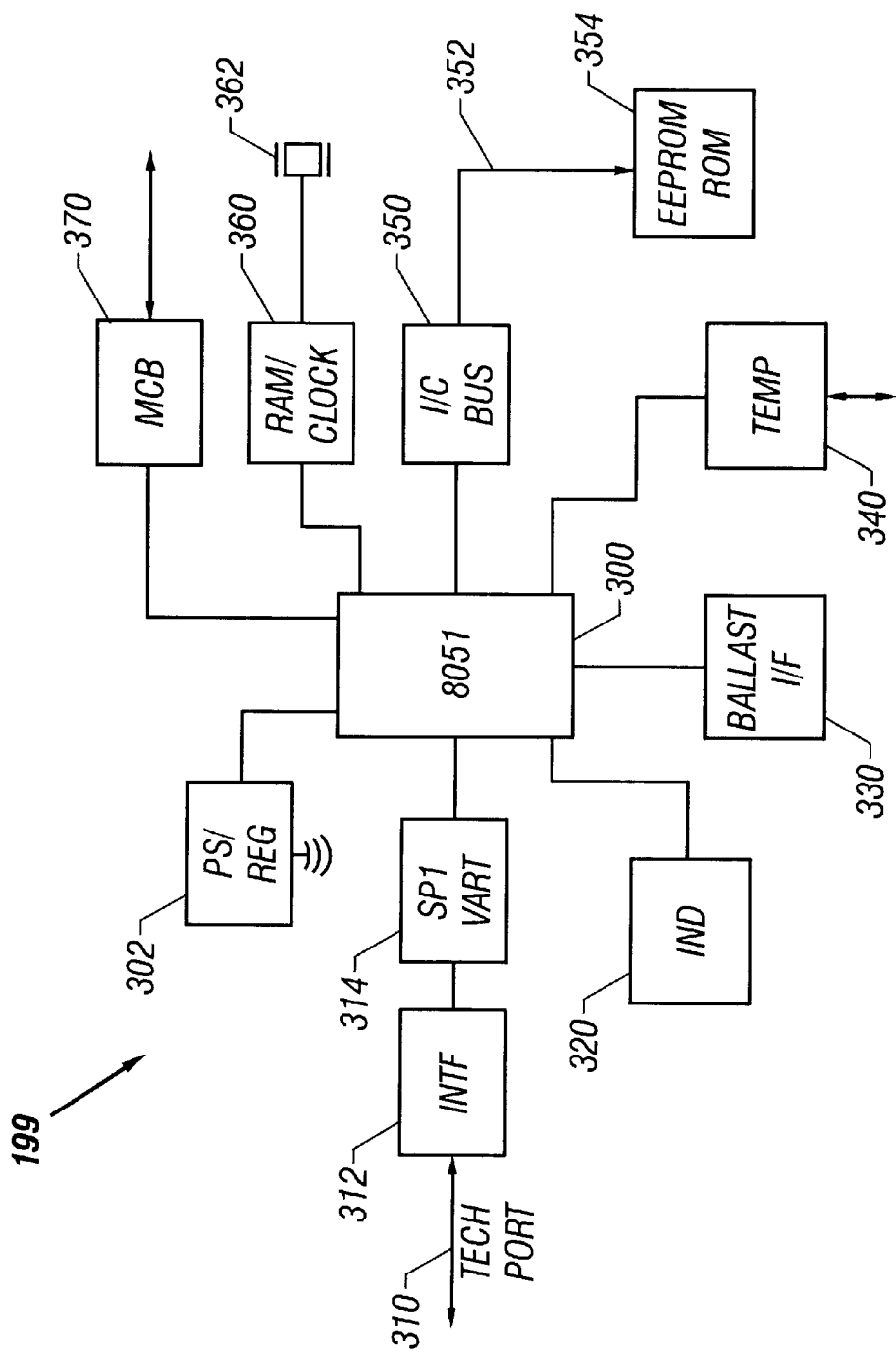
FIG. 3 shows a block diagram of the supervisor hardware.

The supervisor, as described above, is optimized for lower level operations and monitoring; compared with the higher level number crunching operations which are carried out by digital signal processor 150. A block diagram of the supervisor is shown in FIG. 3. A low level microcontroller such as the 8051 forms the microcontrolling operation. A power supply/regulator 302 supplies microcontroller 300 with its own source of power. This is done to minimize problems from other power supplies.

An external interface to supervisor 199 is provided by the tech port 310. The tech port 310 is connected to a tech port interface 312 which connects to the microcontroller through a UART. The tech port enables certain operations of the lamp to be individually controlled through the simplified serial interface.

An optional indicator subsystem 320 provides indications of power, data, and error for the operation of the lamp.

Ballast interface 330 connects to the lamp ballast and controls its operation.

The tech port also includes temperature sensor interface 340. The temperature sensors connect to that interface. An IIC bus driver is also provided as element 350.

The microcontroller uses associated RAM 360 and real time clock, which is battery powered by battery 362.

The microcontroller 8051 also includes an RS-485 interface 370 which forms a motor control bus ("MCB").

As described above, many of the features of the supervisor including the interface elements 312/314, 350 and 370 can be configured out of a field programmable gate array.

The IIC bus 352 connects to a number of different devices, including ROM 354 which includes the yoke serial number, another memory including the head serial number, information indicative of the ballast serial number and the temperature sensor, and the like.

The supervisor tracks bulb life by storing an indication of bulb changing along with the current time stamp, each time a new bulb is placed into service. Time stamps for other events are also stored. The supervisor also keeps track of certain events, including removal of certain subsystems. It is presumed that these subsystems are serviced when removed. All of this information is stored in a system "registry" in EEPROM 354.

Certain changes which cannot be automatically detected, such as the time since bulb change, are manually entered into the registry through the tech port 310.

The information in the registry can be read by the serial device over tech port 310.

An alterative embodiment allows the information to be commanded to be displayed by the lamp itself as a diagnostic gobo. A lamp display command causes the messages to be converted to fonts and used to control the DMD 100 to display the text error message by shaping the text light output. This allows detecting the contents of the registry without a dedicated display terminal using the existing digital light altering device as a display mechanism. This effectively uses the gobo function of pixel-level addressable device to form a diagnostic function.

Figure 4:
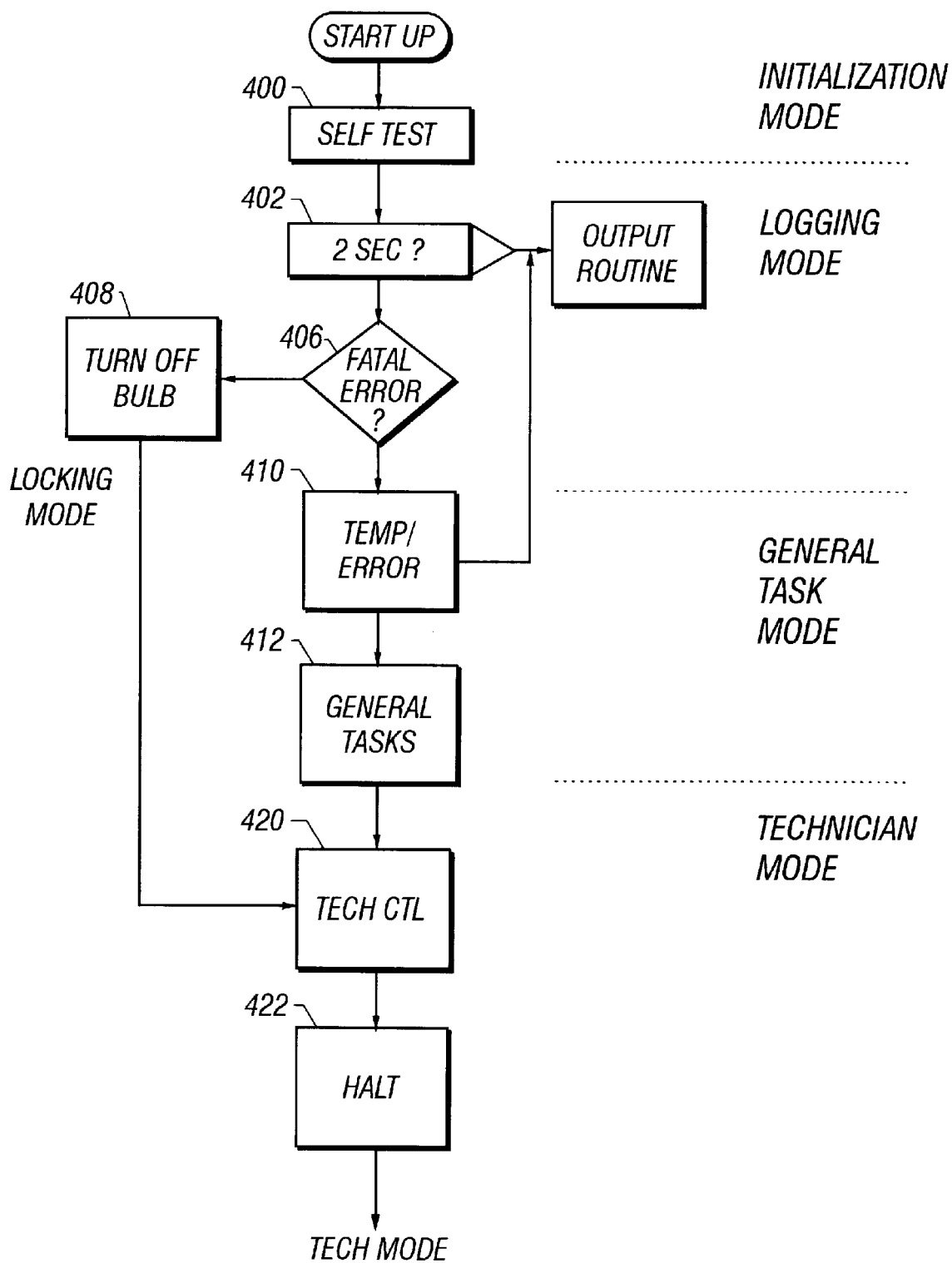
FIG. 4 shows a flowchart of operation of the different processes carried out by the supervisor.

The supervisor has a number of operating modes including the initialization mode, locking mode, general task mode, error mode, and technician mode. Each of these modes will be described with reference to the flowchart of FIG. 4.

The supervisor is initially started in the initialization mode. This mode can use any number of specific internal self tests. The self tests are well known in the art, and are shown generically as step 400. The internal tests include, but are not limited to, the following:

Internal clock running
External Ram test
IIC bus test
Supervisor temperature sensor test
IIC Related Bus Tests:
    Chassis serial number check
    Head serial number check
    Ballast serial number check
    Ballast temperature sensor check
    Remote temperature sensor board test
    TEC Board Test
    Thermocouples present tests
MCB Device Tests:
    DSP master serial number
    Color disk 1 serial number
    Color disk 2 serial number
    Rear zoom lens serial number
    Front zoom lens
    Focus lens
    Shutter
    Custom color
    RGB wheel
    Pan
    Tilt If the device completes all these tests, control passes to the next mode called the logging mode. The supervisor continually logs certain error messages. Step 402 shows a 2-second interrupt driven output routine. The output routine outputs temperature data and bulb run time every 2 seconds. The error messages can be output every 2 seconds. An alternate technique outputs all data changes as they occur. The output preferably occurs via the tech port 310 although alternately output can be carried out in some other way.

The internal motors of the lamp are also monitored for error messages over the MCB. Each drive module can produce either an error message or a lack of response. Either the error message or the lack of response can be taken as an error.

Certain errors are considered fatal errors and detected at step 406. For example, over-temperature errors are considered to be fatal, and certain failed movement errors can be considered as fatal. If a fatal error is determined at step 406, then the bulb is turned off at step 408 to prevent damage, or an erratically-acting lamp unit. An errant light will produce much less visual anomalies if not properly illuminated.

Once the system is placed into the error mode at step 408, it remains that way until the technician takes control of the fixture using the tech port terminal.

The general task processing loop begins at step 410 with reading temperature sensors and error messages and outputting these values to the tech port as necessary. A number of operations are carried out during these general tasks. The lamp is also carefully monitored.

Each time through the loop, the general tasks shown generally as step 412 are also carried out. These general tasks include:

Incrementing lamp run time counter
Incrementing bulb run time counter if bulb is lit
Entering time and date stamp for lamp turn on
Entering time and date stamp for bulb on and off events
Lamp status after self check
Change of assembly including new serial number after change of assembly
Snapshot of temperatures Also errors are logged including non-fatal and fatal errors with time and date stamp information for these errors.

At any time during the operation, the technician can take control of the system, shown as step 420. Normal operation of the lamp is suspended when the technician takes control. This is shown as step 422 which requires a halt when the technician mode is detected at step 420. In technician mode, the system allows:

Clearing the contents of logged memory by downloading the log
Performing set moves to allow the technician to check lamp operation
Run a built-in light "chase"
View error logs in detail or obtain a status check
Perform diagnostic tests and fault finding using the terminal based on error codes
Downlet preset messages to assemblies via the supervisor to test various operations In the tech mode, various errors can also be detected and displayed. Each error code has an associated tech string used to describe the error in plain but abbreviated English. This tech string is transmitted through the serial port 312 to the hand held terminal for display. Various tests are described herein.

The following list details certain types and categories of errors that can be detected. This allows the technician to determine if those errors are fatal or non-fatal.

IIC Bus Start Condition Test
Purpose: Checks that the clock and data lines of the IIC bus respond correctly when a start condition is generated on the IIC bus.
Called: Each time an IIC start subroutine is called.
Errors Reported:
  None; if an error is detected, the IIC bus test routine is called.
IIC Bus Test
Purpose: Checks that the clock and data lines of the IIC bus respond correctly.
Called: At start up and on each read to an IIC device if the lines do not respond correctly during the generation of a start condition (IIC Bus Start Test).
Errors Reported:
  Data line lo.
  Date line Hi.
  Clock line lo.
  Clock line Hi.
  Clock and data line shorted to each other.
This test looks for the correct operation of the IIC bus clock and data lines. All error codes produced by these tests are FATAL because none of the devices on the bus will be accessible to the supervisor. The supervisor sets the clock and data lines hi and waits for one IIC bus clock cycle. The lines are then tested (testing the port pins, not the output latches of the micro controller). If they are in a hi state, two possible errors can be detected at this point; data line pulled low or clock line pulled low.
IIC Acknowledge Test
Purpose: Checks that the selected IIC device which has been addressed generates an acknowledge signal within 32 IIC bus clock cycles.
Called: After any IIC bus address has been issued to talk to a device.
Errors Reported:
  Remote temperature sensing PCG missing.
  Ballast temperature sensor missing.
  Thermo-electric controller board missing.
  Ballast Rom missing.
  Yoke Rom missing.
  Head Rom missing.
  Supervisor temperature sensor missing.
Broken/Missing Thermocouple Test
Purpose: Checks that the selected thermocouple on the remote temperature sensing board is present. If it is missing or broken, it will be flagged as bad in the corresponding status byte for the thermocouple channel.
Called: When each thermocouple is read.
Errors reported:

---

Thermocouple 1 broken or missing.
Thermocouple 2 broken or missing.
Thermocouple 3 broken or missing.
Thermocouple 4 broken or missing.
Thermocouple 5 broken or missing.
Thermocouple 6 broken or missing.
Thermocouple 7 broken or missing.
Thermocouple 8 broken or missing.

---

Note:
There may be further thermocouples on the TEC board which will be labeled T9 to Tn.

Clock Test
Purpose: Checks that the external time-keeper is running by checking that the seconds register increases by 1 second timed by the micro running a software generated delay.
Called: At start-up.
Errors Reported:
  Clock error.
Note: It is also possible to test other registers (i.e., minutes or date) for the numbers being in a valid range if desired.
External Ram Test
Purpose: Checks that the external battery backed ram can be read and written.
Called: At start-up.
Errors reported:
  Read write error.
Note: It may make sense to have this as part of the clock test routine as a missing clock will probably mean missing ram.
Thermocouple Limit Test
Purpose: Checks that a selected thermocouple channel temperature reading has not exceeded a pre-set limit.
Called: When a thermocouple temperature channel is read.
Errors reported:

---

Thermocouple 1 exceeded pre-set temperature.
Thermocouple 2 exceeded pre-set temperature.
Thermocouple 3 exceeded pre-set temperature.
Thermocouple 4 exceeded pre-set temperature.
Thermocouple 5 exceeded pre-set temperature.
Thermocouple 6 exceeded pre-set temperature.
Thermocouple 7 exceeded pre-set temperature.
Thermocouple 8 exceeded pre-set temperature.
Thermocouple 1 exceeded upper temperature limit.
Thermocouple 2 exceeded upper temperature limit.
Thermocouple 3 exceeded upper temperature limit.
Thermocouple 4 exceeded upper temperature limit.
Thermocouple 5 exceeded upper temperature limit.
Thermocouple 6 exceeded upper temperature limit.
Thermocouple 7 exceeded upper temperature limit.
Thermocouple 8 exceeded upper temperature limit.
Thermocouple differential pre-set exceeded.
Thermocouple differential upper limit exceeded

---

Note:
Two types of limits have been outlined. The pre-set limit warns that temperatures are starting to get dangerously high and may point towards a filter on a air intake becoming blocked and requiring cleaning for example. This type of error would be non-fatal. If the upper temperature level is exceeded it becomes a fatal error and the supervisor would have to take steps to protect the fixture. The last two differential errors relate to the temperature measurement on the DMD and the thermo-electriccooling. To prevent damage to the device, the temperature differece cannot exceed a certain level.

Digital Temperature Sensor Limit Test
Purpose: Checks that a selected digital temperature sensor reading has not exceeded a pre-set limit.
Called: When a digital temperature sensor is read.
Error reported:
  Supervisor exceeded pre-set temperature.
  Ballast exceeded pre-set temperature.
  Supervisor exceeded upper temperature limit.
  Ballast exceeded upper temperature limit
Note: Two types of limits have been outlined. The pre-set limit warns that temperatures are starting to get dangerously high and may point towards a filter on an air intake becoming blocked and requiring cleaning for example. This type of error would be non-fatal.
  If the proper temperature level is exceeded, it becomes a fatal error and the supervisor carries out the processing steps to protect the fixture.
  It may well be that no actions will be available to the supervisor to prevent damage other than reducing the power consumption of the fixture.

IIC Serial Number Tests
Purpose: Checks electronic serial number of assemblies on the IIC bus.
Called: During start up.
Errors reported:
  Ballast serial number changed.
  Remote temperature sensor PCB serial number changed.
  TEC serial number changed.
  Yoke serial number changed.
  Head serial number changed.
  Ballast serial number missing/invalid.
  Remote temperature sensor PCB serial number missing/invalid.
  TEC serial number missing/invalid.
  Yoke serial number missing/invalid.
  Head serial number missing/invalid.
Note: Two types of errors have been outlined. A missing serial number error may only be required during manufacturing and testing.

MCB Serial Number Checks
Purpose: Checks electronic serial number of assemblies on the MCB bus.
Called: During start up.
Errors reported:
  DSP master serial number changed.
  Pan assembly serial number changed.
  Tilt assembly serial number changed.
  Lens 1 assembly serial number changed.
  Lens 1 assembly serial number changed.
  Focus assembly serial number changed.
  RGB assembly serial number changed.
  Color disk 1 assembly serial number changed.
  Color disk 2 assembly serial number changed.
  Customer color disk assembly serial number changed.
  Ballast serial number missing/invalid.
  Remote temperature sensor PCB serial number missing/invalid.
  TEC serial number missing/invalid.
  Yoke serial number missing/invalid.
  Head serial number missing/invalid.
Note: Two types of errors have been outlined. A missing serial number error may only be required during manufacturing and testing.
  If a module fails to respond, it can be used to detect the absence of a drive module.

MCB Bus Status Byte Tests
Purpose: Checks status bytes of drive modules on the MCB bus.
Called: During monitoring of MCB bus.
Errors reported:
  Pan has failed to reset.
  Pan drive module over pre-set temperature.
  Pan drive module has exceeded maximum temperature.
  Pan assembly detected MCB errors.
  Tilt has failed to reset.
  Tilt drive module over pre-set temperature.
  Tilt drive module has exceeded maximum temperature.
  Tilt assembly detected MCB errors.
  Lens 1 failed to reset.
  Lens 1 drive over pre-set temperature.
  Lens 1 has exceeded maximum temperature.
  Lens 1 lost position.
  Lens 1 assembly detected MCB errors.
  Lens 2 failed to reset.
  Lens 2 drive over pre-set temperature.
  Lens 2 has exceeded maximum temperature.
  Lens 2 lost position.
  Lens 2 assembly detected MCB errors.
  Focus failed to reset.
  Focus drive over pre-set temperature.
  Focus has exceeded maximum temperature.
  Focus lost position.
  Focus assembly detected MCB errors.
  Color 1 failed to reset.
  Color 1 drive over pre-set temperature.
  Color 1 has exceeded maximum temperature.
  Color 1 lost position.
  Color 1 assembly detected MCB errors.
  Color 2 failed to reset.
  Color 2 drive over pre-set temperature.
  Color 2 has exceeded maximum temperature.
  Color 2 lost position.
  Color 2 assembly detected MCB errors.
  Custom color failed to reset.
  Custom color drive over pre-set temperature.
  Custom color has exceeded maximum temperature.
  Custom color lost position.
  Custom assembly detected MCB errors.
  RGB locator failed to reset.
  RGB locator drive over pre-set temperature.
  RGB locator has exceeded maximum temperature.
  RGB locator lost position.
  RGB assembly detected MCB errors.
  Shutter failed to reset.
  Shutter drive over pre-set temperature.
  Shutter has exceeded maximum temperature.
  Shutter lost position.
  Shutter assembly detected MCB errors.
  DSP RAM error.
  DSP ROM error.
  DSP FPGA error.
  DLP IIC bus error 1.
  DLP IIC bus error 2.
  DLP IIC bus error 3.
  DLP IIC bus error 4.
  ICON data errors (errors detected by DSP master).
  MCB bus data errors (framing and parity errors detected by supervisor).
Note: Two types of errors have been outlined. A missing serial number error may only be required during manufacturing and testing.
  Definition of errors details how they are detected and if they are fatal or non-fatal. This would require outlining how the operator will perceive the error.
  The preferred hand held terminal for the tech port is a micropalm 1200 which has a 320×200 pixel display with gray scale.
  The terminal allows different operations to be displayed. Different temperature readings can be shown on the display.

Time graphs of errors could also be displayed, e.g., a Lime access representing the fixture's running time with each column representing, for example, 10 hours of time.

Operation over the tech port allows the following operations.

Diagnostic Mode

Mode accessed by PIN number or password.

Automatic log-in to supervisor with the required terminal details sent to be logged and date and time stamped by the supervisor.

Request a test of the lamp by the supervisor.

View error log to see what errors may have occurred.

View serial number of lamp.

Check bulb burn time.

Run diagnosis routine to fault-find lamp based on the tests.

Save messages in assembly ROMS for use by service department.

Make copies of logs in the lamp for detail examination by service department, i.e., transferring to a computer to be sent by modem.

Manual Mode

Control the lamp using the displayed menu allowing:

Pan

Tilt

Zoom

Shutter

Color

Gobos

Strike

Douse

A test chase can also be done, with the facility to turn individual functions on and off as required.

Service Mode

This allows downloading of memory contents at a service department and is to be done automatically by placing the terminal into a cradle with the data being collected onto a PC.

Each error condition that can be detected will either be FATAL or NON-FATAL and will have a text message string associated with it used to describe the error in English. This section lists all the errors so a decision can be made to the type of error and corresponding message.

| | |
|---|---|
| 2.1.0 | Each NON-FATAL error will be prefixed with the string - "!ERROR" |
| 2.2.0 | Each FATAL error will be prefixed with the string - "!FATAL ERROR" |
| 2.3.0 | IIC bus errors. (All IIC bus errors are probably Fatal) (Fatal) ET: Message: |
| 2.3.1 | Data line shorted to OV (Fatal) ET: Message: |
| 2.3.2 | Data line shorted to 5V (Fatal) ET: Message: |
| 2.3.3 | Clock line shorted to OV (Fatal) ET: Message: |
| 2.3.4 | Clock line shorted to 5V (Fatal) ET: Message: |
| 2.3.5 | Clock and data line shorted to each other (Fatal) ET: Message: |

Note: If the IIC bus is faulty no data transactions can occur.

| | |
|---|---|
| 2.4.0 | Remote temperature sensing PCB missing (Fatal) ET: Message: |
| 2.5.0 | Ballast temperature sensor missing ET: Message: |
| 2.6.0 | Thermo-electric controller board missing (Fatal) ET: Message: |

Note: The TEC board will control the temperature of the DMD using the thermo-electric controller

| | |
|---|---|
| 2.7.0 | Ballast Rom missing ET: Message: |
| 2.8.0 | Yoke Rom missing ET: Message: |
| 2.9.0 | Head Rom missing ET: Message: |
| 2.10.0 | Supervisor temperature sensor missing ET: Message: |
| 2.11.0 | Thermocouple 1 broken or missing ET: Message: |
| 2.12.0 | Thermocouple 2 broken or missing ET: Message: |
| 2.13.0 | Thermocouple 3 broken or missing ET: Message: |
| 2.14.0 | Thermocouple 4 broken or missing ET: Message: |
| 2.15.0 | Thermocouple 5 broken or missing ET: Message: |
| 2.16.0 | Thermocouple 6 broken or missing ET: Message: |
| 2.17.0 | Thermocouple 7 broken or missing ET: Message: |
| 2.18.0 | Thermocouple 8 broken or missing ET: Message: |
| 2.19.0 | Clock error ET: Message: |
| 2.20.0 | Thermocouple 1 exceeded pre-set temperature (Non-Fatal) ET: Message: |
| 2.21.0 | Thermocouple 2 exceeded pre-set temperature (Non-Fatal) ET: Message: |
| 2.22.0 | Thermocouple 3 exceeded pre-set temperature (Non-Fatal) ET: Message: |
| 2.23.0 | Thermocouple 4 exceeded pre-set temperature (Non-Fatal) ET: Message: |
| 2.24.0 | Thermocouple 5 exceeded pre-set temperature (Non-Fatal) ET: Message: |
| 2.25.0 | Thermocouple 6 exceeded pre-set temperature (Non-Fatal) ET: Message: |
| 2.26.0 | Thermocouple 7 exceeded pre-set temperature (Non-Fatal) ET: Message: |
| 2.27.0 | Thermocouple 8 exceeded pre-set temperature (Non-Fatal) ET: Message: |
| 2.28.0 | Thermocouple 1 exceeded upper temperature limit (Fatal) ET: Message: |
| 2.29.0 | Thermocouple 2 exceeded upper temperature limit (Fatal) ET: Message: |
| 2.30.0 | Thermocouple 3 exceeded upper temperature limit (Fatal) ET: Message: |
| 2.31.0 | Thermocouple 4 exceeded upper temperature limit (Fatal) ET: Message: |
| 2.32.0 | Thermocouple 5 exceeded upper temperature limit (Fatal) ET: Message: |
| 2.33.0 | Thermocouple 6 exceeded upper temperature limit (Fatal) ET: Message: |
| 2.34.0 | Thermocouple 7 exceeded upper temperature limit (Fatal) ET: Message: |
| 2.35.0 | Thermocouple 8 exceeded upper temperature limit (Fatal) ET: Message: |
| 2.36.0 | Thermocouple differential pre-set exceeded (Non-Fatal) ET: Message: |
| 2.37.0 | Thermocouple differential upper limit exceeded (Fatal) ET: Message: |
| 2.38.0 | Supervisor exceeded pre-set temperature (Non-Fatal) ET: Message: |

-continued

| | |
|---|---|
| 2.39.0 | Ballast exceeded pre-set temperature (Non-Fatal) |
| | ET: Message: |
| 2.40.0 | Supervisor exceeded upper temperature limit (Fatal) |
| | ET: Message: |

Note: The supervisor has a Lithium battery in its external RAM. This will pose a hazard if operated at high temperatures.

| | |
|---|---|
| 2.41.0 | Ballast exceeded upper temperature limit (Fatal) |
| | ET: Message: |
| 2.42.0 | Ballast serial number changed |
| | ET: Message: |
| 2.43.0 | Remote temperature sensor PCB serial number changed |
| | ET: Message: |
| 2.44.0 | TEC serial number changed |
| | ET: Message: |
| 2.45.0 | Yoke serial number changed |
| | ET: Message: |
| 2.46.0 | Head serial number changed |
| | ET: Message: |
| 2.47.0 | Ballast serial number missing/invalid |
| | ET: Message: |
| 2.48.0 | Remote temperature sensor PCB serial number missing/invalid |
| 2.49.0 | TEC serial number missing/invalid |
| | ET: Message: |
| 2.50.0 | Yoke serial number missing/invalid |
| | ET: Message: |
| 2.51.0 | Head serial number missing/invalid |
| | ET: Message: |
| 2.52.0 | DSP master serial number changed |
| | ET: Message: |
| 2.53.0 | Pan assembly serial number changed |
| | ET: Message: |
| 2.54.0 | Tilt assembly serial number changed |
| | ET: Message: |
| 2.55.0 | Lens 1 assembly serial number changed |
| | ET: Message: |
| 2.56.0 | Lens 1 assembly serial number changed |
| | ET: Message: |
| 2.57.0 | Focus assembly serial number changed |
| | ET: Message: |
| 2.58.0 | RGB assembly serial number changed |
| | ET: Message: |
| 2.59.0 | Color disk 1 assembly serial number changed |
| | ET: Message: |
| 2.60.0 | Color disk 2 assembly serial number changed |
| | ET: Message: |
| 2.61.0 | Custom Color disk assembly serial number changed |
| | ET: Message: |
| 2.62.0 | Ballast serial number missing/invalid |
| | ET: Message: |
| 2.63.0 | Remote temperature sensor PCB serial number missing/invalid |
| 2.64.0 | TEC serial number missing/invalid |
| | ET: Message: |
| 2.65.0 | Yoke serial number missing/invalid |
| | ET: Message: |
| 2.66.0 | Head serial number missing/invalid |
| | ET: Message: |
| 2.67.0 | Pan has failed to reset |
| | ET: Message: |
| 2.68.0 | Pan drive module over pre-set temperature |
| 2.69.0 | Pan drive module has exceeded maximum temperature |
| | ET: Message: |
| 2.70.0 | Pan assembly detected MCB errors |
| | ET: Message: |
| 2.71.0 | Tilt has failed to reset |
| | ET: Message: |
| 2.72.0 | Tilt drive module over pre-set temperature |
| | ET: Message: |
| 2.73.0 | Tilt drive module has exceeded maximum temperature |
| | ET: Message: |
| 2.74.0 | Tilt assembly detected MCB errors |
| | ET: Message: |
| 2.75.0 | Lens 1 failed to reset |
| | ET: Message: |
| 2.76.0 | Lens 1 drive over pre-set temperature |
| | ET: Message: |
| 2.77.0 | Lens 1 has exceeded maximum temperature |
| | ET: Message: |
| 2.78.0 | Lens 1 lost position |
| | ET: Message: |
| 2.79.0 | Lens 1 assembly detected MCB errors |
| | ET: Message: |
| 2.80.0 | Lens 1 corrected loss of position |
| | ET: Message: |
| 2.81.0 | Lens 2 failed to reset |
| | ET: Message: |
| 2.82.0 | Lens 2 drive over pre-set temperature |
| | ET: Message: |
| 2.83.0 | Lens 2 has exceeded maximum temperature |
| | ET: Message: |
| 2.84.0 | Lens 2 lost position |
| | ET: Message: |
| 2.85.0 | Lens 2 assembly detected MCB errors |
| | ET: Message: |
| 2.86.0 | Lens 2 corrected loss of position |
| | ET: Message: |

Note: Lens 1 and 2 form the zoom function and share the same mechanical assembly. If one lens has failed to reset or lost position, it may mean that the second lens may collide with the first so both will have to be shut down to prevent damage.

| | |
|---|---|
| 2.87.0 | Focus failed to reset |
| | ET: Message: |
| 2.88.0 | Focus drive over pre-set temperature |
| | ET: Message: |
| 2.89.0 | Focus has exceeded maximum temperature |
| | ET: Message: |
| 2.90.0 | Focus lost position |
| | ET: Message: |
| 2.91.0 | Focus assembly detected MCB errors |
| | ET: Message: |
| 2.92.0 | Focus corrected loss of position |
| | ET: Message: |
| 2.94.0 | Color 1 drive over pre-set temperature |
| | ET: Message: |
| 2.95.0 | Color 1 has exceeded maximum temperature |
| | ET: Message: |
| 2.96.0 | Color 1 lost position |
| | ET: Message: |
| 2.97.0 | Color 1 assembly detected MCB errors |
| | ET: Message: |
| 2.98.0 | Color 1 corrected loss of position |
| | ET: Message: |
| 2.99.0 | Color 2 failed to reset |
| | ET: Message: |
| 2.100.0 | Color 2 drive over pre-set temperature |
| | ET: Message: |
| 2.101.0 | Color 2 has exceeded maximum temperature |
| | ET: Message: |
| 2.102.0 | Color 2 lost position |
| | ET: Message: |
| 2.103.0 | Color 2 assembly detected MCB errors |
| | ET: Message: |
| 2.104.0 | Color 2 corrected loss of position |
| | ET: Message: |
| 2.105.0 | Custom color failed to reset |
| | ET: Message: |
| 2.106.0 | Customer color drive over pre-set temperature |
| | ET: Message: |
| 2.107.0 | Custom color has exceeded maximum temperature |
| | ET: Message: |
| 2.108.0 | Custom color lost position |
| | ET: Message: |
| 2.109.0 | Custom assembly detected MCB errors |
| | ET: Message: |
| 2.110.0 | Customer corrected loss of position |

-continued

| | ET: Message: |
|---|---|
| 2.111.0 | RGB locator failed to reset |
| | ET: Message: |
| 2.112.0 | RGB locator drive over pre-set temperature |
| | ET: Message: |
| 2.113.0 | RGB locator has exceeded maximum temperature |
| | ET: Message: |
| 2.114.0 | RGB locator lost position |
| | ET:. Message: |
| 2.115.0 | RGB assembly detected MCB errors |
| | ET: Message: |
| 2.116.0 | Shutter failed to reset |
| | ET: Message: |
| 2.117.0 | Shutter drive over pre-set temperature |
| | ET: Message: |
| 2.118.0 | Shutter has exceeded maximum temperature |
| | ET: Message: |
| 2.119.0 | Shutter lost position |
| | ET: Message: |
| 2.120.0 | Shutter assembly detected MCB errors |
| | ET: Message: |
| 2.121.0 | Shutter corrected loss of position |
| | ET: Message: |
| 2.122.0 | DSP RAM error |
| | ET: Message: |
| 2.123.0 | DSP ROM error |
| | ET: Message: |
| 2.124.0 | DSP FPGA error |
| | ET: Message: |
| 2.125.0 | DLP IIC bus error 1 |
| | ET: Message: |
| 2.126.0 | DLP IIC bus error 2 |
| | ET: Message: |
| 2.227.0 | DLP IIC bus error 3 |
| | ET: Message |
| 1.128.0 | DLP IIC bus error 4 |
| | ET: Message: |
| 2.129.0 | ICON data errors (errors detected by DSP master) |
| | ET: Message: |
| 2.130.0 | MCB bus data errors (framing and parity errors detected by supervisor) |
| | ET: Message: |

Another operation which can be carried out is the diagnostic gobo. This allows the system to be monitored from the console. Specifically, since the digital mirror device can arrange the shape of light into any desired shape, it can include font shapes. This enables the technician to use the console to focus the image on a screen or any suitable surface. Lamp status can then be seen by the fonts which are prestored and projected by the fixture. This enables checking an entire system relatively quickly.

The same error handling techniques are used, and in this case, the DSP 250 can store font information. This enables projecting the diagnostic gobo information. Of course, certain faults may prevent the diagnostic gobo from operating. For example, if the DSP is not working or if zoom or focus has a problem, then the image is not readable. Failure of pan and tilt may prevent moving the lamp to a position where it is viewable. Moreover, any fatal error will cause the lamp to turn off, hence preventing the image from being seen.

If the lamp can be seen, however, any desired error could be presented. This can include details of custom gobo pallets, lamp status, and bulb life. A non-exclusive list of different errors and their status follows.

Figure 6:
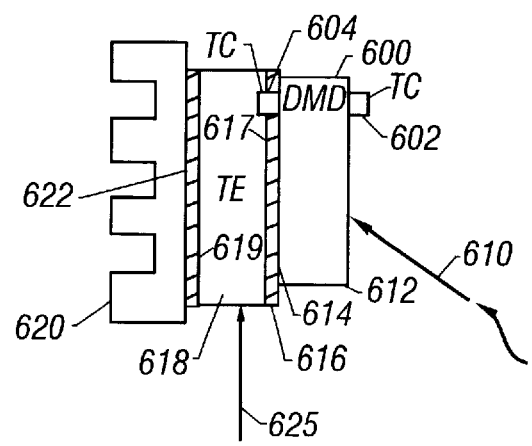
FIG. 6 shows the thermoelectric cooler connected to the digital mirror.

Another embodiment is shown in FIG. 6. Specifically, the DMD 100 has very exacting temperature requirements. The surface of the DMD needs to be kept at 55° C. or less and preferably below 45° C. The inventors believe that the life of the DMD will be improved if it can be kept below 40° C. The inventors have also recognized the desirability of maintaining the temperature differential, or delta T, across the DMD. The inventors postulate that the delta T should not be greater than 15° C.: i.e. the temperature of the front of the DMD must be within 15° C. of the temperature of the back of the DMD. However, this provides a special cooling challenge for the DMD when cooled from the rear.

The solution, illustrated in FIG. 6, is to use a pulse width modulated thermo-electric cooler. A thermo-electric cooler is a device which pumps cold from one side to the other using the Peltier effect. When current is applied across the thermo-electric device, one side becomes very cold and the other side becomes very hot. This has the effect of essentially pumping the heat from the cold side to the hot side.

The overall structure is shown in FIG. 6. The DMD 600 has thermocouples 602 and 604, respectively, on the front and rear sides thereof. These thermocouples monitor the surface temperatures of the DMD device.

In operation, incoming light 610 bounces off the front surface 612 of the DMD. A certain amount of this light is converted to heat which hence travels from the front surface.

The back surface 614 of the DMD is coated with thermally conducting paste 616. This past 616 provides a thermal bond between the back surface of the DMD and the thermo-electric cooler 618. The cold side 617 of the thermo-electric cooler 618 is pressed against the back surface 614 of the DMD. The hot surface 619 of the thermoelectric cooler 618 is pressed against a cooling heat sink 620 via thermally conductive paste 622.

In operation, the thermo-electric cooler is energized by an energizing signal 625. The energizing signal 625, when active, causes the thermo-electrical cooler to be heated on the hot side 619 and cooled on the cold side 617. However, this could overcool the back side 614 of the DMD 600 relative to the front 612. The signal 625 therefore is provided at a specified duty cycle less than 100% to avoid this high thermal gradient.

The DMD is preferably cooled to 30–40° C.

Figure 7:
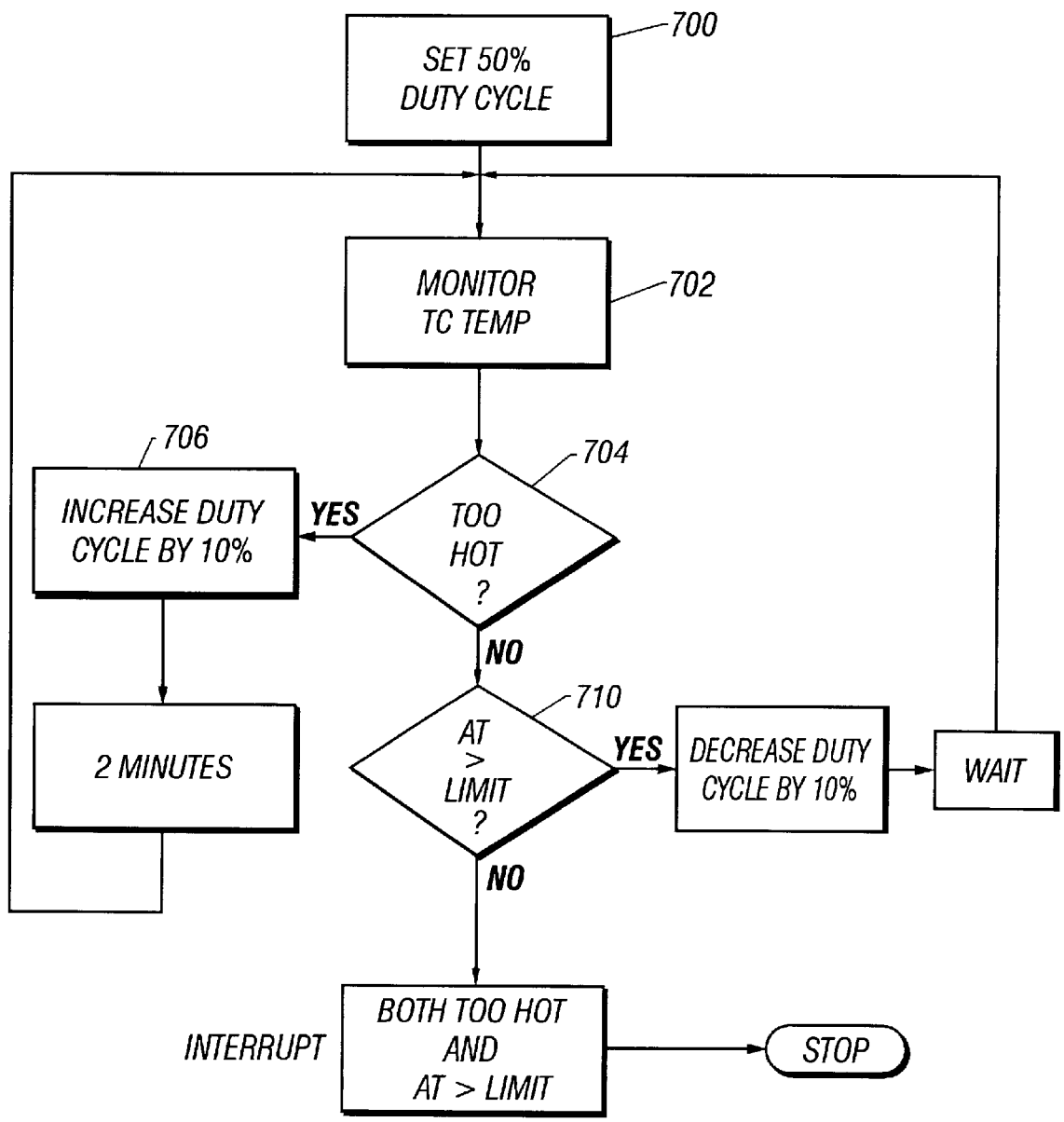
FIG. 7 shows a flowchart of the cooling operation carried out by the thermoelectric device.

The operation is shown with respect to the flowchart of FIG. 7. As a baseline initial value, a 50 k duty cycle is used for the starting operation at step 700. This value is used when the DMD is operating properly, and during time while the light 610 is being reflected. The temperature of the thermocouple 602 is monitored at step 702. When step 704 indicates that the front surface of the DMD is getting too hot, the duty cycle is increased by 10% at a time shown at step 706, and a 2 minute settling time is allowed. Then the duty cycle can be increased by another 10% if necessary. If the delta T from front 612 to back 614 gets too high as detected at step 710, the duty cycle is reduced to compensate. This allows the overall temperature to be increased some in order to reduce delta T. When both the delta T and temperature get too high, the lamp may need to be doused or dimmed in order to reduce the delta T. This is shown as an interrupt in FIG. 7.

Figure 5A:
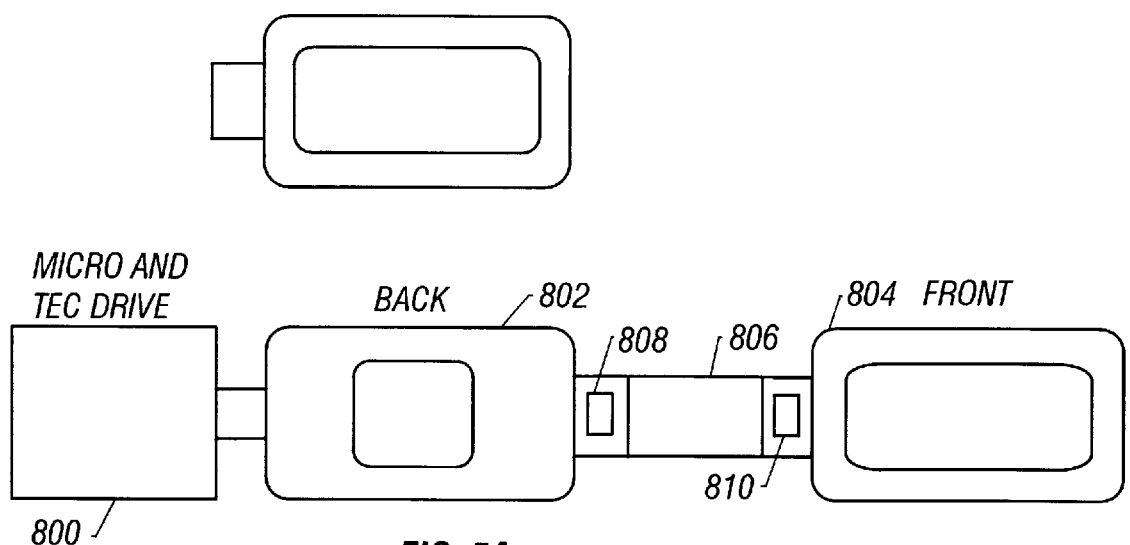
FIGS. 5A and 5B show a service package type cooler and detector device.
Figure 5B:
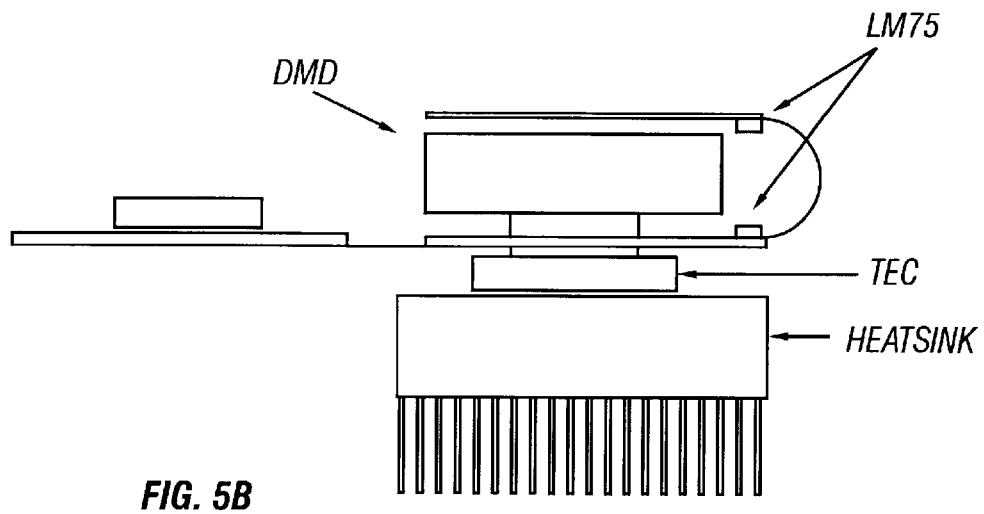

An even further preferred system carries out the temperature sensing and cooling of the device using a service pack device shown in FIGS. 5A and 5B. FIG. 5A shows the unit as laid out in a line. The drive element 800 produces drive signals for providing cooling power to the rear TE device 802 and to the front TE device 804. Front device 802 and rear device 804 are connected by an electrical connection 806, which also houses front temp sensor 808 and rear temp sensor 810. This allows separately cooling the front surface and rear surface, and also separately sensing the temperatures of the first and second surfaces.

Although only a few embodiments have been described in detail above, other embodiments are contemplated by the inventor and are intended to be encompassed within the following claims. In addition, other modifications are contemplated and are also intended to be covered.

What is claimed is:

1. A light system, comprising:
a digital micromirror device;
a thermoelectric device, in thermal contact with said digital micromirror device; and
a control structure which pulse width modulates a drive to said thermoelectric device.

2. An apparatus as in claim 1, further comprising a processor, which detects both front and back temperatures of said digital micromirror device, and controls said drive based on both said front and back temperature.

3. A system as in claim 1, further comprising a temperature sensor, thermally coupled to said digital micromirror device, and driving said control structure to change said drive to said thermoelectric device.

4. An apparatus as in claim 2, further comprising temperature sensors, thermally coupled to front and back surfaces of said micromirror device respectively, and wherein said processor outputs values to maintain a difference between said front and back temperatures <15 degrees C.

5. An apparatus as in claim 4, further comprising controlling said surfaces to maintain their temperature less than a specified value.

6. An apparatus as in claim 5, wherein said temperature is maintained below 40 degrees C.

7. A system as in claim 3, wherein said temperature sensor includes a thermocouple.

8. A system as in claim 2, wherein said processor initially controls the thermoelectric device using a baseline duty cycle, and changes said baseline duty cycle based on detected temperatures of the surfaces.

9. A system as in claim 1, further comprising a fault detection element, which detects excess heat on said micromirror device, and declares a fault based on said excess heat.

10. A system as in claim 9, further comprising a control structure that reduces an output of a light shining on said micromirror device responsive to said fault.

11. A system as in claim 8, wherein said processor waits after changing said duty cycle to allow temperatures to settle.

12. A method, comprising
forming a beam of light to be used to illuminate a performance area;
using a digital device in a path of said light to change some aspect of said light;
cooling said digital device with a pulse width modulated drive that periodically cools said digital device and then ceases cooling said digital device.

13. A method as in claims 12, wherein said cooling comprises cooling said digital device with a thermoelectric cooling element.

14. A method as in claim 13, wherein said digital device is a digital micromirror device.

15. A method as in claim 12, further comprising detecting temperatures of surfaces of said digital device.

16. A method as in claim 15, wherein said detecting comprises detecting a surface temperature of a front surface of said digital device, and detecting a temperature of a rear surface of said digital device, and controlling said cooling based on a difference between said temperature of said rear surface and said temperature of said front surface.

17. A method as in claim 15, wherein said detecting comprises detecting a surface temperature of a front surface of said digital device, and detecting a temperature of a rear surface of said digital device, and controlling said cooling based both on an absolute temperature and on a difference between said temperature of said rear surface and said temperature of said front surface.

18. A method as in claim 12, further comprising detecting a temperature of said digital device.

19. A method as in claim 18, further comprising detecting said temperature being above a specified limit, and reducing a level of said beam of light wherein said temperature is above said specified limit.

20. A system, comprising:
a digital light control device;
a temperature detector, coupled to at least a first surface of said digital light control device, and a second surface of said digital light control device, and producing output signals indicative of temperatures of said surfaces; and
a cooler, coupled to one surface of said digital light control device, and controlled to cool said digital light control device based on a difference between said temperature of said first surface and said temperature of said second surface.

21. A system as in claim 20, wherein said cooler includes a thermoelectric cooler.

22. A system as in claim 20, wherein said cooler is controlled according to a pulse width modulated control, which alternately controls cooling at a first level and then controls cooling at a second level, according to a periodically changing control.

23. A system as in claim 22, wherein said pulse width modulated control has a duty cycle which is changed based on said difference.

24. A system as in claim 23, wherein said duty cycle is also changed based on at least one absolute temperature.

25. A system as in claim 24, wherein said digital light control device is a digital mirror device.

26. A system as in claim 20, wherein said temperature detector includes thermocouples.

27. A system as in claim 20, wherein said first and second surfaces include front and rear surfaces.

28. A system as in claim 27, wherein said cooler is coupled to said rear surface.

29. A system as in claim 22, further comprising a processing element which controls said pulse width modulated control, said processing element starting at a baseline initial value duty cycle, and adjusting said baseline based on said difference.

30. A system comprising:
a digital light controling device;
a first cooling part for a front surface of the digital light controlling device that receives the light to be reflected, said first cooling part cooling said front surface based on a first control signal; and
a second cooling part for a rear surface of the digital light controlling device, said second cooling part cooling said rear surface based on a second control signal that is different than said first control signal.

31. A system as in claim 30, wherein said digital light control device is a digital mirror device.

32. A system as in claim 30, wherein said first and second cooling parts include electrically controlled coolers.

33. A system as in claim 32, wherein said electrically controlled coolers include thermoelectric devices.

34. A system as in claim 30, further comprising a first temperature sensing parts sensing a temperature of said front surface and a second temperature sensing parts sensing a temperature of said rear surface.

35. A system as in claim 34, further comprising a first device, holding said first temperature sensor and said first cooling part, and a second device holding a second temperature sensor and a second cooling part.

36. A system as in claim 35, wherein said first device is coupled to said second device.

* * * * *